March 17, 1970        A. M. VIK        3,501,189

SAFETY REAR DOOR LOCK FOR AUTOMOBILES

Filed Feb. 8, 1968        2 Sheets-Sheet 1

INVENTOR.
ALBAM M. VIK

BY

ATTORNEY

March 17, 1970  A. M. VIK  3,501,189
SAFETY REAR DOOR LOCK FOR AUTOMOBILES
Filed Feb. 8, 1968  2 Sheets-Sheet 2

INVENTOR.
ALBAM M. VIK
BY
ATTORNEY

United States Patent Office 3,501,189
Patented Mar. 17, 1970

3,501,189
SAFETY REAR DOOR LOCK FOR AUTOMOBILES
Albam M. Vik, New Brighton, Minn., assignor, by mesne assignments, to Dempco, Inc., Minneapolis, Minn., a corporation of Minnesota
Filed Feb. 8, 1968, Ser. No. 703,981
Int. Cl. E05c *13/04;* E05b *65/40*
U.S. Cl. 292—216                                    7 Claims

ABSTRACT OF THE DISCLOSURE

A rear door lock for automobiles consisting of a striker plate resiliently mounted on the forward vertical edge of the center post of the vehicle in position to engage the rearward vertical edge of the front door as the front door closes such that the movement of the rear vertical edge of the front door towards its closed position shifts the striker plate rearwardly. Engaged on the rearward surface of the strike plate is a lock operating rod that extends rearwardly through the rear door and is secured at its rearward end to the door lock supplied by the manufacturer of the automobile. The rearward movement of the rod shifts the latch portion of the door lock to its locked position by disconnecting outside and inside door handles from the latch actuating member.

---

The rear doors of an automobile provide a great advantage for entering and leaving the rear seat but also create serious safety hazards for small children occupying the rear seat. In the past many accidents have been caused by children playing with door handles. Accordingly, several devices have been made in the past for preventing the rear door from opening when the front door is closed. These prior mechanisms all have the following objectives and advantages. First, they prevent the rear door from opening when the front door is closed. Second, they provide convenience in eliminating the necessity for unlocking the rear door. Third, there is no requirement for remembering to lock the rear door when entering or leaving and when returning to the car with packages that are to be placed in the rear seat, it is necessary only to open the front door slightly to unlock the rear door rather than having to reach in around the door post to lift the door lock button.

In spite of these advantages, the rear door locks previously proposed have several serious disadvantages. The first is that they are not well suited for modern automotive production and assembly. Second, they have a tendency to get out of adjustment or in the alternative they have so much play (clearance) between latching parts that a tight fit cannot be obtained.

The most common of the rear door locking devices that are operated by the front door consist of a sliding member which will be referred to for convenience as a "bolt" mounted for sliding movement along a longitudinal axis within the door post and adapted, when engaged by the front door, to slide rearwardly to a position in which it projects through the space between the door frame and the rear door along either the front edge and the rear edge of the rear door or along both. In an alternative system, the locking bolts slide upwardly from the threshold of the door into the lower edge of the door.

Bolts of this kind are not connected to the lock that is operated by the handle of the door and referred to herein either as "the manufacturer's lock" or the "production door lock." These auxiliary bolts act independently of the production door lock. The independent operation of the production door lock and the door operated bolt I have found is an important factor in the problems associated with this type of lock. Their frequent requirement for adjustment is due largely to the necessity that they slide smoothly into an opening in the door that has a tendency to move out of alignment with the bolt during the normal life of the car. Thus, it is common because of twisting that occurs in the frame or as the result of door sag for adjustments to be necessary occasionally in the production door latch and door latch engaging stop. These changes, of course, cause the same misalignment between the bolt and the opening provided to receive it. Accordingly, adjustment of the bolt or its opening is necessary in order for the parts to be properly aligned. In the alternative, it is possible to provide substantial clearance between parts but this results in a loose fit which is, of course, undesirable.

Thus, each adjustment of the front or rear door necessitates changing position of the bolt to exactly match the new position of the door and the manufacturer's door lock. The same problem occurs during fabrication of the automobile when the doors are being fitted to the frame necessitating an initial adjustment during production to assure that the auxiliary bolts will fit properly in the openings adapted to receive them. This adjustment, of course, increases manufacturing costs.

Prior auxiliary door locks have a further disadvantage. Each time an attempt is made to open the rear door when the front door is locked the manufacturer's door lock will be disengaged. The manufacturer's door lock is, of course, provided with an automatic wear take-up that maintains the cushioning on the edge of the door under compression. However, when the manufacturer's door lock is released in this manner, only the bolt remains in place to hold the door in its locked position. The bolt is unsuited for automatic wear take-up. Accordingly, the door will no longer be tightly retained in the closed position and will have a tendency to rattle. Moreover, if the manufacturer's door lock is unlocked in this manner, it is impossible to relock it without releasing the auxiliary bolt.

In addition to the objectives common to those of prior rear door locks of the type described, the present invention has the following objectives and advantages: (a) it is well suited for economical manufacture; (b) it is adapted for modern high-speed automotive production processes; (c) it is rugged in construction, reliable in operation and employs with a minimum of parts; (d) it requires no independent adjustment as a result of door sag, frame deformation or because it is necessary to maintain close tolerances between engaged parts; (e) it will reliably maintain the rear door in its tightly locked condition even when an attempt is made to open the rear door after the front door has been closed; (f) when in operation the rear door lock will be mechanically disconnected or disengaged from the inner and outer door operating handles or levers thereby preventing strain or possible damage to the lock elements by the operation of the door handles; (g) it includes a provision for making adjustments due to variations in the clearance between the door and the door frame from one automobile to another and (h) a provision that enables the rear door lock to be quickly unlocked in the event the latch remains stuck in the locked position when the striker plate is released.

These and other more detailed and specific objects will become apparent from the following specification and drawings wherein.

Figure 1:
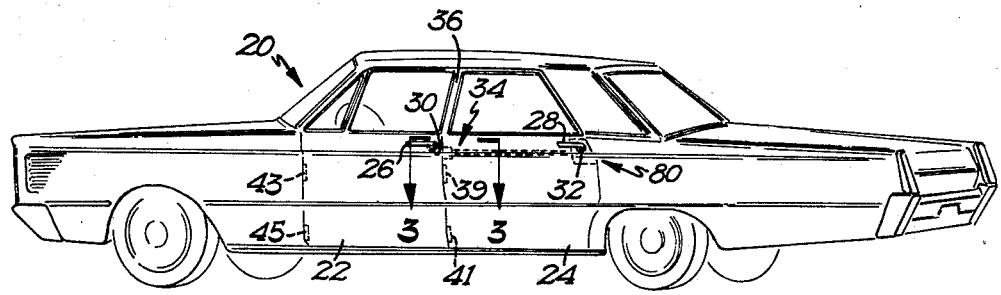
FIGURE 1 is a left perspective view of an automobile embodying the invention.
Figures 2, 6:
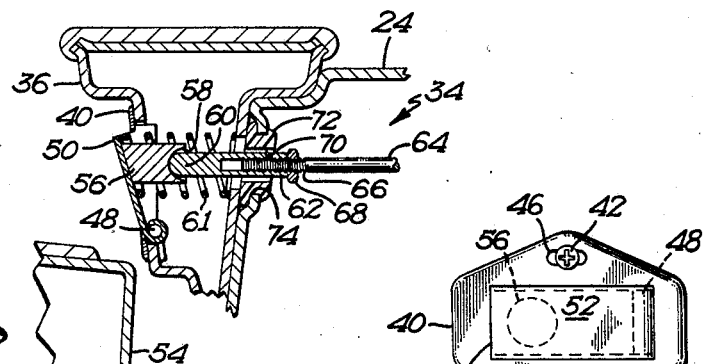
FIGURE 2 is a partial horizontal sectional view taken on line 2—2 of FIGURE 1 but on a greatly enlarged scale with the front door in a partially open position and the rear door in a closed position.
FIGURE 6 is a front elevational view of the front surface of the door post showing the striker plate and its mounting bracket.
Figure 4:
FIGURE 4 is a side elevational view of the invention on a somewhat reduced scale relative to FIGURES 2 and 3.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

In the drawings is shown a four-door automobile 20 having front and rear doors 22 and 24 respectively. The doors include the usual door operating handles 26 and 28 as well as lock operating levers 30 and 32 that are mounted to slide inwardly in the usual manner when pressure is applied by the person opening the door. The doors, door handles, door operating levers are all entirely conventional and by themselves form no part of the present invention. The rear door safety lock embodying the invention is indicated generally at 34. The lock mechanism 34 is shown only on the left side of the automobile 20 but it is to be understood that a similar lock mechanism will be employed on the right side of the automobile.

The automobile body includes the usual center post 36 to which the front edge of the rear door is secured by hinges 39 and 41. The front door is secured to the body along its forward vertical edge by means of hinges 43 and 45.

The safety door lock 34 will now be described with particular reference to FIGURES 2, 3, 4, and 5. Secured to the front vertical surface of the center post 36 is a mounting bracket 40 composed of a flat plate. It is affixed to the door post 36 by screws 42 and 44. The bracket 40 is provided with horizontally extending slots 46 and 49 respectively adapted to permit horizontal adjustment of the bracket as required. Pivotally secured to the bracket 40 by means of a pin 48 is a striker 50 having a forward surface 52 adapted to be engaged by the rearward vertical surface 54 of the front door 22 as the front door is moved to its closed position. Extending rearwardly from the striker and rigidly secured thereto is a cylinder 56 having a socket 58 at its rearward end adapted to receive the forward end 60 of a cap 62 secured to the end of an actuator rod 64 by the provision of screw threads 66 (FIG. 2) so that, in effect, the length of the actuating rod 64 can be adjusted. The cap 62 is releasably held in a selected position by the provision of a lock nut 68. The actuator rod 64 consists of ⅛ inch spring steel rod. Mounted over the cylinder 56 is a compression spring 61.

Figure 5:
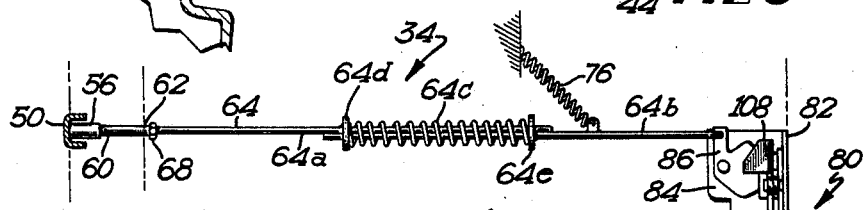
FIGURE 5 is a partial side elevational view of an alternate form of lock actuating rod.
Figure 3:
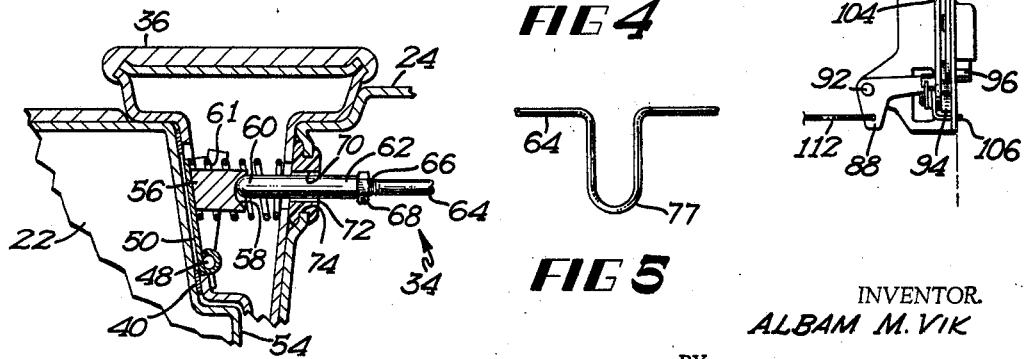
FIGURE 3 is a view similar to FIGURE 2 with the front door in the closed position.

The rod 64 is divided into two parts 64a and 64b as seen in FIGURE 5 which are forced away from another by a relatively stiff compression spring 64c, the ends of which abut against suitable stops 64d and 64e. It can be seen that during operation closing the front door 22 will pivot the free end of the striker 50 rearwardly thereby forcing the actuator rod 64 rearwardly when the front door reaches its closed position. It will be seen that the cap 62 extends through an opening 70 within a plastic grommet 72 that is snap-fitted into an opening 74 on the forward vertical edge of the rear door 24 so that it can be removed in the event that the cap 62 and lock nut 68 require adjustment.

As shown in FIGURE 5, tension spring 76 is connected to the rearward portion 74b of the actuator rod 64 to force it forwardly. The spring 64c is relatively stiff compared with spring 76 so that normally there is little, if any, movement between the parts 64a and 64b as the striker plate 50 is moved rearwardly so as to stretch the spring 76. The spring 76 can be thought of as a resilient member for urging the actuator rod forwardly while the spring 64c functions as a resilient member for allowing limited compression of the ends of the rod towards one another. Spring 64c is useful in certain types of door locks to accommodate for a forward force exerted upon the rearward end of the door actuating rod when the rear door is closed and the front door already in the closed position.

An alternative form of resilient means for allowing limited compression of the door actuating rod 64 is shown in FIGURE 5. It consists of a generally U-shaped bend 77 that projects downwardly at about the center of the door actuating rod. In this instance the door actuating rod 64 consists of one piece. The embodiment shown in FIGURE 5 is somewhat simpler to construct and less costly than that of FIGURE 4.

The rearward end of the door lock actuating rod 64 is coupled to a manufacturer's door lock 80 which is for the most part conventional. The manufacturer's door lock 80 will be described briefly in connection with FIGURES 7 and 8. It consists of vertically disposed laterally and longitudinally extending webs 82 and 84 respectively. On web 84 two bell cranks 86 and 88 are pivotally secured by means of pivots 90 and 92 respectively.

Figure 7:
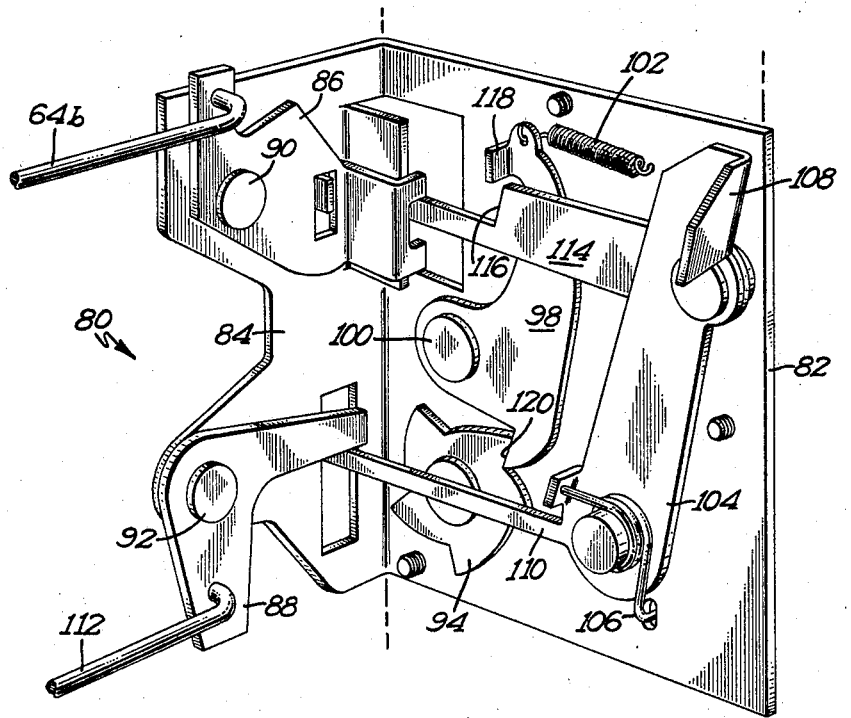
FIGURE 7 is a perspective view of the manufacturer's door lock with the lock actuating rod in the locking position.
Figure 8:
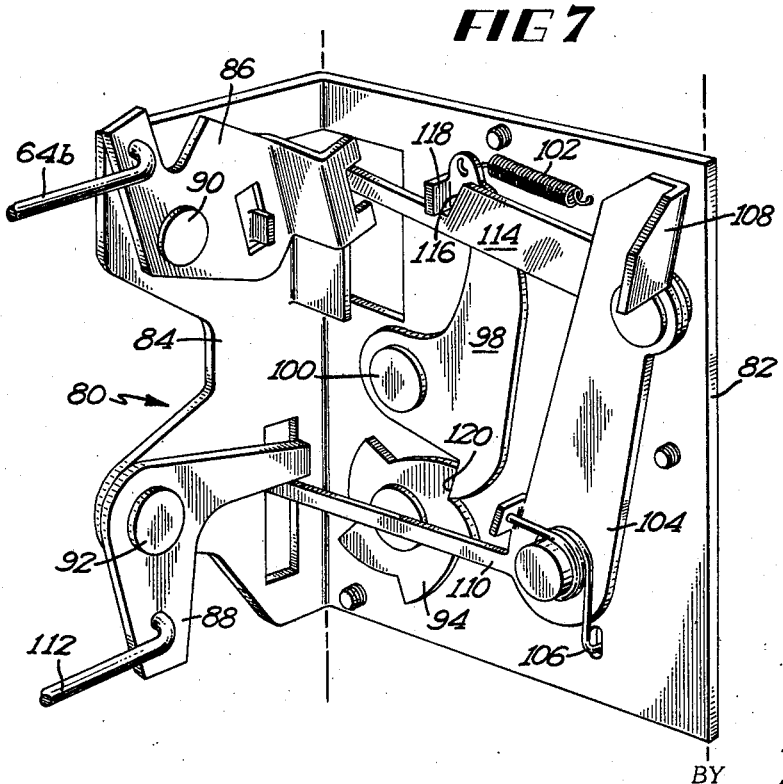
FIGURE 8 is a view similar to FIGURE 7 showing the lock actuating rod in its unlocked position.

A door latch composed of a ratchet wheel 94 is mounted for rotation within web 82. It includes a rear door latch portion 96 (FIG. 4) which is entirely conventional and is adapted to engage a locking stop (not shown) on the door frame. A lever 98 is mounted on a pivot 100 in web 82 above the ratchet wheel 94 and is urged in a clockwise direction as seen in FIGURES 7 and 8 by helical spring 102. A lever 104 is urged in the same direction by a spring 106. The lever 104 is provided with an extension 108 positioned to engage the door button 32 shown in FIGURE 1 so as to move inwardly or toward the left as seen in FIGURES 7 and 8 when the door button is depressed. The lever 104 has an extension 110 operatively associated with the the bell crank 88. The bell crank 88 is connected by means of a rod 112 (only a portion of which is shown) to the inside door lever.

Extending between the bell crank 86 and lever 104 is a link 114 having a projection 116 adapted to engage a sear 118 on the upward end of the lever 98 when the bell crank 86 is moved counterclockwise to the position of FIGURE 8 by the spring 76. However, when moved rearwardly by the striker plate 52 the projection 116 will be disengaged from the sear 118 (FIG. 7). In this manner, when the bell crank 86 is moved, as shown in FIGURE 8, the central movement of the upper end of the lever 104 either by the door button 32 or the bell crank 88 will disengage the projection 120 at the lower end of the lever 98 from the ratchet wheel 94 thereby enabling the door to open. However, when the actuator rod 64 is moved rearwardly by the striker plate 50, the clockwise movement of the bell crank 86 will disengage the projection in 116 from the sear 118 thereby, in effect, disconnecting the outer and inner door actuating levers from the manufacturer's door lock 80 so as to sear the door in a locked condition.

The striker plate and actuator rod may be thought of as an actuator assembly operatively associated between the rearward edge of the front door and the manufacturer's door lock 80 for securing the manufacturer's door lock in the locked position when the actuator assembly is moved rearwardly by the closing of the front door.

From the foregoing it can be seen that closing of the front door will reliably lock the back door thereby protecting the occupants of the rear seat. It can also be seen that few parts are required in addition to those normally used by the manufacturer. The invention is, moreover, easily installed and adjusted at the time of installation.

Initially, the only adjustment required is the proper positioning of the cap on the end of the rod 64 primarily to make adjustments for variations in the clearance between the door and the door frame from one automobile to another. As wear occurs during the life of the car, it may be necessary to reposition the cap or to adjust the position of the mounting bracket 40. For the most part, however, no independent adjustment of the safety lock made in accordance with the invention is required during the life of the automobile as a result of deformation of a portion of an automobile framework or door.

It should be noted that when an attempt is made to open the rear door after the front door has been closed, the lock will reliably maintain the rear door in a tightly locked condition. It can also be seen that the operation of the door handles when the rear door is locked, since they are mechanically disconnected or disengaged from the latching elements of the door, will not be subjected to excessive strain or possible damage.

If during fabrication of the automobile or at some other time, as for example, following an accident, the rear door lock becomes stuck in the locked position, the condition can be quickly corrected by removing the bracket 40 from the door post 36.

It is apparent that many modifications and variations of this invention as hereinbefore set forth may be made without departing from the spirit and scope thereof.

I claim:

1. A safety door lock for the rear door of an automobile comprising in combination a door lock at the rearward vertical edge of the rear door including a rotatable latch element extending rearwardly from the rearward edge of the door, a latch engaging member on the door frame adjacent the latching member in position to engage the same when the rear door is closed, an inside manually engageable door handle operatively associated with the rear door lock, a manually engageable lock operating member on the outside of the rear door operatively associated with the rear door lock, an elongated element extending forwardly from the rear door lock to the vicinity of the rearward vertical surface of a front door and operatively associated therewith such that the elongated element is shifted along a longitudinally extending axis in a selected direction when the front door is moved to its closed position, and means operatively associating the elongated element with the lock causing the latch to be retained in the locked position in engagement with the latch engaging element when the inside door handle and manually engageable lock operating member on the outside surface of the door are operated.

2. The apparatus according to claim 1 wherein the rearward movement of the elongated element disengages the inside door handle and manually engageable lock operating member from the latch whereby manual operation of either the member or the handle will not release the latch when the front door is in its closed position.

3. The apparatus of claim 1 wherein a bracket is mounted on a forward vertical surface of a center post of the automobile, said bracket including a striker plate pivotally mounted for movement about a vertical axis with the free end thereof positioned to move a limited distance along the longitudinal axis of said automobile when the front door of the vehicle is moved to its closed position.

4. The apparatus of claim 1 wherein a resilient element is operatively associated with the elongated element between the elongated element and the door for yieldably biasing the elongated element and the striker plate forwardly whereby the last movement of the front door towards its closing position will force the striker plate and elongated element rearwardly against the tension of the resilient means.

5. The apparatus of claim 1 having a striker plate mounted resiliently on the forward portion of the door frame in a position to be engaged by the rearward vertical edge of the front door.

6. The apparatus of claim 1 wherein the elongated element is provided with a resilient member for providing limited longitudinal compression of the elongated element.

7. The apparatus of claim 1 wherein a striker plate is mounted resiliently on the automobile in a position to be engaged by the rearward vertical edge of the front door.

References Cited

UNITED STATES PATENTS

| | | | |
|---|---|---|---|
| 2,640,720 | 6/1953 | Brown | 292—150 |
| 2,709,102 | 5/1955 | Phinney et al. | 292—336.3 |
| 3,030,794 | 4/1962 | Dyer et al. | 70—264 |

RICHARD E. MOORE, Primary Examiner

U.S. Cl. X.R.,

292—210